(12) United States Patent
Huber et al.

(10) Patent No.: US 9,957,184 B2
(45) Date of Patent: May 1, 2018

(54) SUBMERGED COMBUSTION GLASS MANUFACTURING SYSTEM AND METHOD

(71) Applicant: JOHNS MANVILLE, Denver, CO (US)

(72) Inventors: Aaron Morgan Huber, Castle Rock, CO (US); Marlon Keith Martin, Etowah, TN (US)

(73) Assignee: Johns Manville, Denver, CO (US)

( * ) Notice: Subject to any disclaimer, the term of this patent is extended or adjusted under 35 U.S.C. 154(b) by 0 days. days.

(21) Appl. No.: 15/271,624

(22) Filed: Sep. 21, 2016

(65) Prior Publication Data

US 2017/0022083 A1 Jan. 26, 2017

Related U.S. Application Data

(62) Division of application No. 14/208,029, filed on Mar. 13, 2014, now Pat. No. 9,481,592, which is a division
(Continued)

(51) Int. Cl.
*C03B 5/237* (2006.01)
*C03B 5/167* (2006.01)
(Continued)

(52) U.S. Cl.
CPC .............. *C03B 5/167* (2013.01); *C03B 5/183* (2013.01); *C03B 5/193* (2013.01); *C03B 5/237* (2013.01);
(Continued)

(58) Field of Classification Search
None
See application file for complete search history.

(56) References Cited

U.S. PATENT DOCUMENTS

| 1,579,353 A | 4/1926 | Good |
| 1,636,151 A | 7/1927 | Schofield |

(Continued)

FOREIGN PATENT DOCUMENTS

| CH | 254 502 A | 5/1948 |
| DE | 10 38 721 B | 9/1958 |

(Continued)

OTHER PUBLICATIONS

"AccuTru Temperature Measurement," AccuTru International Corporation, 2003.

(Continued)

*Primary Examiner* — Cynthia Szewczyk
(74) *Attorney, Agent, or Firm* — Robert D. Touslee

(57) ABSTRACT

Submerged combustion glass manufacturing systems include a melter having a floor, a roof, a wall structure connecting the floor and roof, and an exhaust passage through the roof. One or more submerged combustion burners are mounted in the floor and/or wall structure discharging combustion products under a level of material being melted in the melter and create turbulent conditions in the material. The melter exhausts through an exhaust structure connecting the exhaust passage with an exhaust stack. The exhaust structure includes a barrier defining an exhaust chamber having an interior surface, the exhaust chamber having a cross-sectional area greater than that of the exhaust stack but less than the melter. The barrier maintains temperature and pressure in the exhaust structure at values sufficient to substantially prevent condensation of exhaust material on the interior surface.

11 Claims, 7 Drawing Sheets

Related U.S. Application Data of application No. 13/268,098, filed on Oct. 7, 2011, now Pat. No. 8,707,740.

(51) Int. Cl.
  *C03B 5/193* (2006.01)
  *C03B 5/235* (2006.01)
  *C03B 5/183* (2006.01)

(52) U.S. Cl.
  CPC .......... *C03B 5/2353* (2013.01); *C03B 5/2356* (2013.01); *C03B 2211/22* (2013.01); *C03B 2211/23* (2013.01); *C03B 2211/40* (2013.01)

(56) References Cited

U.S. PATENT DOCUMENTS

| | | |
|---|---|---|
| 1,679,295 A | 7/1928 | Dodge |
| 1,706,857 A | 3/1929 | Mathe |
| 1,716,433 A | 6/1929 | Ellis |
| 1,875,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,597,858 A | 5/1952 | Howard |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,499,743 A | 3/1970 | Fanica et al. |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Worner |
| 3,649,235 A | 3/1972 | Harris |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,248,615 A * | 2/1981 | Seng ............... C03B 3/023 264/117 |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,353,726 A * | 10/1982 | Rough, Sr. ............ C03B 3/023 165/104.18 |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |

(56) References Cited

U.S. PATENT DOCUMENTS

| | | | |
|---|---|---|---|
| 4,432,780 | A | 2/1984 | Propster et al. |
| 4,455,762 | A | 6/1984 | Saeman |
| 4,461,576 | A | 7/1984 | King |
| 4,488,537 | A | 12/1984 | Laurent |
| 4,508,970 | A | 4/1985 | Ackerman |
| 4,528,012 | A * | 7/1985 | Sturgill .................. C03B 5/237 432/180 |
| 4,539,034 | A | 9/1985 | Hanneken |
| 4,542,106 | A | 9/1985 | Sproull |
| 4,545,800 | A | 10/1985 | Won et al. |
| 4,549,896 | A | 10/1985 | Streicher et al. |
| 4,599,100 | A | 7/1986 | Demarest |
| 4,622,007 | A | 11/1986 | Gitman |
| 4,626,199 | A | 12/1986 | Bounini |
| 4,632,687 | A | 12/1986 | Kunkle et al. |
| 4,634,461 | A | 1/1987 | Demarest, Jr. et al. |
| 4,657,586 | A | 4/1987 | Masterson et al. |
| 4,718,931 | A | 1/1988 | Boettner |
| 4,723,708 | A | 2/1988 | Berger et al. |
| 4,735,642 | A | 4/1988 | Jensen et al. |
| 4,738,938 | A | 4/1988 | Kunkle et al. |
| 4,758,259 | A | 7/1988 | Jensen |
| 4,780,122 | A | 10/1988 | Schwenninger et al. |
| 4,794,860 | A | 1/1989 | Welton |
| 4,798,616 | A | 1/1989 | Knavish et al. |
| 4,812,372 | A | 3/1989 | Kithany |
| 4,814,387 | A | 3/1989 | Donat |
| 4,816,056 | A | 3/1989 | Tsai et al. |
| 4,818,265 | A | 4/1989 | Krumwiede et al. |
| 4,877,436 | A | 10/1989 | Sheinkop |
| 4,877,449 | A | 10/1989 | Khinkis |
| 4,878,829 | A | 11/1989 | Anderson |
| 4,882,736 | A | 11/1989 | Pieper |
| 4,886,539 | A | 12/1989 | Gerutti et al. |
| 4,900,337 | A | 2/1990 | Zortea et al. |
| 4,919,700 | A | 4/1990 | Pecoraro et al. |
| 4,927,386 | A | 5/1990 | Backderf et al. |
| 4,932,035 | A | 6/1990 | Pieper |
| 4,953,376 | A | 9/1990 | Merlone |
| 4,963,731 | A | 10/1990 | King |
| 4,969,942 | A | 11/1990 | Schwenninger et al. |
| 4,973,346 | A | 11/1990 | Kobayashi et al. |
| 5,011,086 | A | 4/1991 | Sonnleitner |
| 5,032,230 | A | 7/1991 | Shepherd |
| 5,052,874 | A | 10/1991 | Johanson |
| 5,062,789 | A | 11/1991 | Gitman |
| 5,097,802 | A | 3/1992 | Clawson |
| 5,168,109 | A | 12/1992 | Backderf et al. |
| 5,169,424 | A | 12/1992 | Grinnen et al. |
| 5,194,747 | A | 3/1993 | Culpepper et al. |
| 5,199,866 | A | 4/1993 | Joshi et al. |
| 5,204,082 | A | 4/1993 | Schendel |
| 5,299,929 | A | 4/1994 | Yap |
| 5,360,171 | A | 11/1994 | Yap |
| 5,374,595 | A | 12/1994 | Dumbaugh et al. |
| 5,405,082 | A | 4/1995 | Brown et al. |
| 5,412,882 | A | 5/1995 | Zippe et al. |
| 5,449,286 | A | 9/1995 | Snyder et al. |
| 5,473,885 | A | 12/1995 | Hunter, Jr. et al. |
| 5,483,548 | A | 1/1996 | Coble |
| 5,490,775 | A | 2/1996 | Joshi et al. |
| 5,522,721 | A | 6/1996 | Drogue et al. |
| 5,545,031 | A | 8/1996 | Joshi et al. |
| 5,575,637 | A | 11/1996 | Slavejkov et al. |
| 5,586,999 | A | 12/1996 | Kobayashi |
| 5,595,703 | A | 1/1997 | Swaelens et al. |
| 5,606,965 | A | 3/1997 | Panz et al. |
| 5,613,994 | A | 3/1997 | Muniz et al. |
| 5,615,668 | A | 4/1997 | Panz et al. |
| 5,636,623 | A | 6/1997 | Panz et al. |
| 5,672,827 | A | 9/1997 | Jursich |
| 5,713,668 | A | 2/1998 | Lunghofer et al. |
| 5,718,741 | A | 2/1998 | Hull et al. |
| 5,724,901 | A | 3/1998 | Guy et al. |
| 5,736,476 | A | 4/1998 | Warzke et al. |
| 5,743,723 | A | 4/1998 | Iatrides et al. |
| 5,765,964 | A | 6/1998 | Calcote et al. |
| 5,814,121 | A | 9/1998 | Travis |
| 5,829,962 | A | 11/1998 | Drasek et al. |
| 5,833,447 | A | 11/1998 | Bodelin et al. |
| 5,849,058 | A | 12/1998 | Takeshita et al. |
| 5,863,195 | A | 1/1999 | Feldermann |
| 5,887,978 | A | 3/1999 | Lunghofer et al. |
| 5,944,507 | A | 8/1999 | Feldermann |
| 5,944,864 | A | 8/1999 | Hull et al. |
| 5,954,498 | A | 9/1999 | Joshi et al. |
| 5,975,886 | A | 11/1999 | Phillippe |
| 5,979,191 | A | 11/1999 | Jian |
| 5,984,667 | A | 11/1999 | Philippe et al. |
| 5,993,203 | A | 11/1999 | Koppang |
| 6,029,910 | A | 2/2000 | Joshi et al. |
| 6,036,480 | A | 3/2000 | Hughes et al. |
| 6,039,787 | A | 3/2000 | Edlinger |
| 6,044,667 | A | 4/2000 | Chenoweth |
| 6,045,353 | A | 4/2000 | VonDrasek et al. |
| 6,068,468 | A | 5/2000 | Phillippe et al. |
| 6,071,116 | A | 6/2000 | Phillippe et al. |
| 6,074,197 | A | 6/2000 | Phillippe |
| 6,077,072 | A | 6/2000 | Marin et al. |
| 6,085,551 | A | 7/2000 | Pieper et al. |
| 6,109,062 | A | 8/2000 | Richards |
| 6,113,389 | A | 9/2000 | Joshi et al. |
| 6,116,896 | A | 9/2000 | Joshi et al. |
| 6,120,889 | A | 9/2000 | Turner et al. |
| 6,123,542 | A | 9/2000 | Joshi et al. |
| 6,126,438 | A | 10/2000 | Joshi et al. |
| 6,154,481 | A | 11/2000 | Sorg et al. |
| 6,156,285 | A | 12/2000 | Adams et al. |
| 6,171,100 | B1 | 1/2001 | Joshi et al. |
| 6,178,777 | B1 | 1/2001 | Chenoweth |
| 6,183,848 | B1 | 2/2001 | Turner et al. |
| 6,210,151 | B1 | 4/2001 | Joshi et al. |
| 6,210,703 | B1 | 4/2001 | Novich |
| 6,237,369 | B1 | 5/2001 | LeBlanc et al. |
| 6,241,514 | B1 | 6/2001 | Joshi et al. |
| 6,244,197 | B1 | 6/2001 | Coble |
| 6,244,857 | B1 | 6/2001 | VonDrasek et al. |
| 6,247,315 | B1 | 6/2001 | Marin et al. |
| 6,250,136 | B1 | 6/2001 | Igreja |
| 6,250,916 | B1 | 6/2001 | Phillippe et al. |
| 6,274,164 | B1 | 8/2001 | Novich |
| 6,276,924 | B1 | 8/2001 | Joshi et al. |
| 6,276,928 | B1 | 8/2001 | Joshi et al. |
| 6,293,277 | B1 | 9/2001 | Panz et al. |
| 6,314,760 | B1 | 11/2001 | Chenoweth |
| 6,314,896 | B1 | 11/2001 | Marin et al. |
| 6,318,126 | B1 | 11/2001 | Takei et al. |
| 6,332,339 | B1 | 12/2001 | Kawaguchi et al. |
| 6,338,337 | B1 | 1/2002 | Panz et al. |
| 6,339,610 | B1 | 1/2002 | Hoyer et al. |
| 6,344,747 | B1 | 2/2002 | Lunghofer et al. |
| 6,357,264 | B1 | 3/2002 | Richards |
| 6,386,271 | B1 | 5/2002 | Kawamoto et al. |
| 6,398,547 | B1 | 6/2002 | Joshi et al. |
| 6,404,799 | B1 | 6/2002 | Mori et al. |
| 6,418,755 | B2 | 7/2002 | Chenoweth |
| 6,422,041 | B1 | 7/2002 | Simpson et al. |
| 6,454,562 | B1 | 9/2002 | Joshi et al. |
| 6,460,376 | B1 | 10/2002 | Jeanvoine et al. |
| 6,470,710 | B1 | 10/2002 | Takei et al. |
| 6,536,238 | B2 | 3/2003 | Kawaguchi et al. |
| 6,536,651 | B2 | 3/2003 | Ezumi et al. |
| 6,558,606 | B1 | 5/2003 | Kulkarni et al. |
| 6,578,779 | B2 | 6/2003 | Dion |
| 6,660,106 | B1 | 12/2003 | Babel et al. |
| 6,694,791 | B1 | 2/2004 | Johnson et al. |
| 6,701,617 | B2 | 3/2004 | Li et al. |
| 6,701,751 | B2 | 3/2004 | Arechaga et al. |
| 6,705,118 | B2 | 3/2004 | Simpson et al. |
| 6,708,527 | B1 | 3/2004 | Ibarlucea et al. |
| 6,711,942 | B2 | 3/2004 | Getman et al. |
| 6,715,319 | B2 | 4/2004 | Barrow et al. |
| 6,722,161 | B2 | 4/2004 | LeBlanc |
| 6,736,129 | B1 | 5/2004 | Sjith |

(56) References Cited

U.S. PATENT DOCUMENTS

| | | |
|---|---|---|
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdahl |
| 2005/0236747 A1 | 10/2005 | Rue et al. |
| 2006/0000239 A1 | 1/2006 | Jeanvoine et al. |
| 2006/0101859 A1 | 5/2006 | Takagaki et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1* | 7/2009 | Jacques .................... C03B 3/00 501/17 |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0016922 A1 | 1/2011 | Kitamura et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0036952 A1 | 4/2013 | Charbonneau et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0090421 A1 | 4/2014 | Shock et al. |

(56) References Cited

U.S. PATENT DOCUMENTS

| | | | |
|---|---|---|---|
| 2014/0090422 | A1 | 4/2014 | Charbonneau et al. |
| 2014/0090423 | A1 | 4/2014 | Charbonneau et al. |
| 2014/0144185 | A1 | 5/2014 | Shock et al. |
| 2016/0116214 | A1 | 4/2016 | Kirschen |

FOREIGN PATENT DOCUMENTS

| | | |
|---|---|---|
| DE | 11 05 116 B | 4/1961 |
| DE | 36 29 965 A1 | 3/1988 |
| DE | 40 00 358 C2 | 3/1993 |
| DE | 44 24 814 A1 | 1/1996 |
| DE | 196 19 919 A1 | 8/1997 |
| DE | 100 29 983 A1 | 1/2002 |
| DE | 100 29 983 C2 | 9/2003 |
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 2 138 465 A2 | 12/2009 |
| EP | 1 986 966 B1 | 4/2010 |
| EP | 1 667 934 B1 | 2/2011 |
| EP | 2 397 446 A2 | 12/2011 |
| EP | 2 404 880 A1 | 1/2012 |
| EP | 2 433 911 A1 | 3/2012 |
| EP | 2 578 548 A2 | 4/2013 |
| FR | 2 740 860 A1 | 9/1997 |
| GB | 191301772 | 1/1914 |
| GB | 191407633 | 3/1914 |
| GB | 164073 A | 5/1921 |
| GB | 250 536 A | 7/1926 |
| GB | 959 895 A | 6/1964 |
| GB | 1449439 | 9/1976 |
| GB | 1 514 317 A | 6/1978 |
| GB | 2 424 644 A | 10/2006 |
| IT | 1208172 | 7/1989 |
| JP | S58 199728 A | 11/1983 |
| JP | H08 290918 A | 11/1996 |
| KR | 2000 0050572 A | 8/2000 |
| KR | 100465272 B1 | 12/2004 |
| RO | 114827 | 7/1999 |
| SU | 986873 A | 7/1983 |
| WO | 1998055411 A1 | 12/1998 |
| WO | 2008103291 A1 | 8/2008 |
| WO | 2010011701 A2 | 1/2010 |
| WO | 2010045196 A3 | 4/2010 |
| WO | 2012048790 A1 | 4/2012 |
| WO | 2012125665 A1 | 9/2012 |
| WO | 2013 162986 A1 | 10/2013 |
| WO | 2013 188082 A1 | 12/2013 |
| WO | 2013188167 A1 | 12/2013 |
| WO | 2009091558 A1 | 9/2016 |

OTHER PUBLICATIONS

"Glass Technologies—The Legacy of a Successful Public-Private Partnership", 2007, U.S. Department of Energy, pp. 1-32.
"Glass Melting Technology—A Technical and Economic Assessment," 2004, U.S. Department of Energy, pp. 1-292.
Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting—The Next Generation Melter", Gas Technology Institute, Project No. 20621 Final Report (2008).
Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.
Sims, Richard, "Batch charging technologies—a review", www.glassonweb.com, Nikolaus Sorg Gmbh & Co KG (May 2011).
"Canty Process Technology" brochure, date unknown, received in Apr. 2012 at American Institute of Chemical Engineers, Spring Meeting, Houston, TX.
"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass industry of the Future", United States Department of Energy, report 02-GA50113-03, pp. 1-17, Sep. 30, 2008.
Stevenson, "Foam Engineering: Fundamentals and Applications", Chapter 16, pp. 336-389, John Wiley & Sons (Mar. 13, 2012).
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes for Improved Efficiency", DE-FG07-96EE41262, Final Report, Mar. 31, 2003.
Conradt et al, Foaming behavior on glass melts, Glastechniche Berichte 60 (1937) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3), pp. 551-555, 1991.
Kim et al., "Foaming in Glass Melts Produced by Sodium Sulfate Decomposition under Ramp Heating Conditions", Journal of the American Ceramic Society, 75(11), pp. 2959-2963, 1992.
Kim et al., "Effect of Furnace Atmosphere on E-glass Foaming", Journal of Non-Crystalline Solids, 352(50/51), pp. 5287-5295, 2006.
Van Limpt et al., "Modelling the evaporation of boron species. Part 1. Alkali-free borosilicate glass melts", Glass Technology—European Journal of Glass Science and Technology, Part A, 52(3): pp. 77-87, 2011.
Olabin, V.M. et al. "Submerged Combustion Furnace for Glass Melts," Ceramic Engineering and Science Proceedings, Jan. 1, 1996, pp. 84-92, vol. 17—No. 2, American Ceramic Society Inc., US.
"Gamma Irradiators for Radiation Processing" Booklet, International Atomic Energy Agency, Vienna, Austria.
Furman, BJ, ME 120 Experimental Methods Vibration Measurement, San Jose University Department of Mechanical and Aerospace Engineering.
Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
Gerber, J., "Les Densimetres Industriels," Petrole et Techniques, Association Francaise des Techniciens du Petrole, Jun. 1, 1989, pp. 26-27, No. 349, Paris, France.
Rue et al, "Submerged Combustion Melting of Glass," International Journal of Applied Glass Science, Nov. 9, 2011, pp. 262-274, vol. 2, No. 4.
National Laboratory, US DOE Contract No. DE-AC09-08SR22470, Oct. 2011.

* cited by examiner

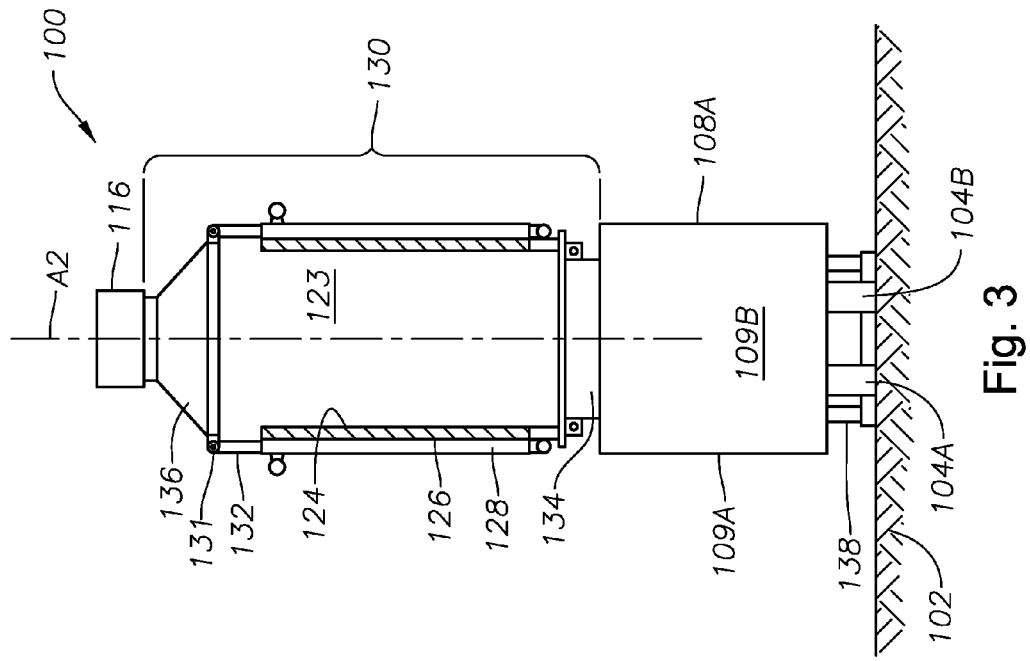
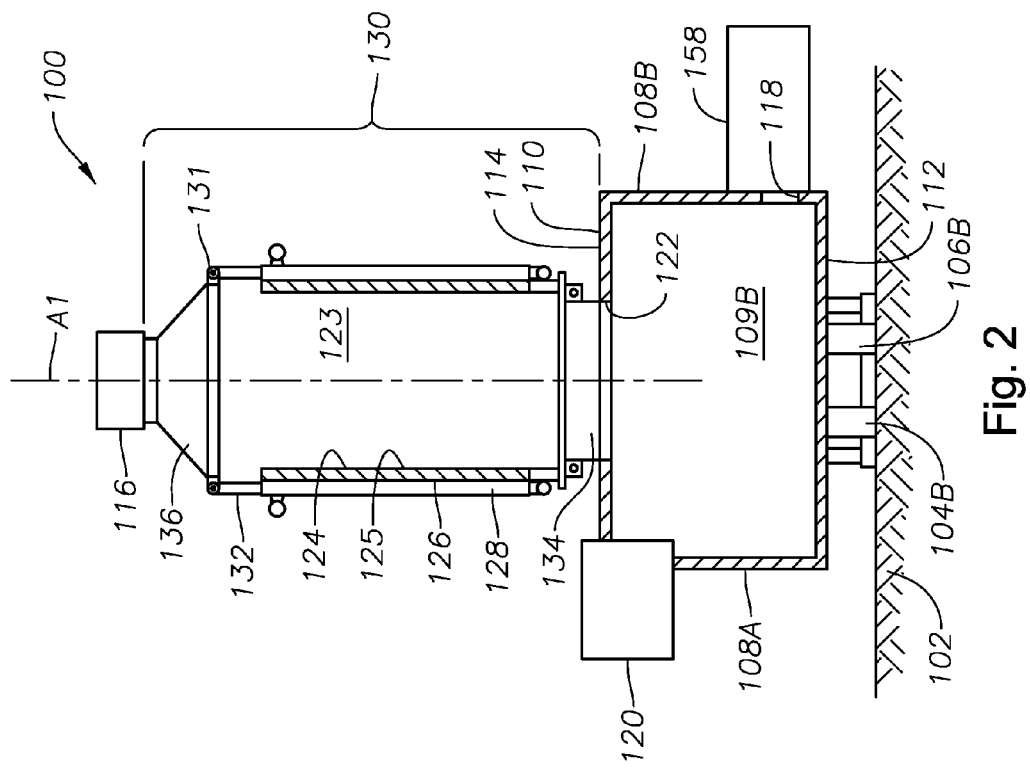

SUBMERGED COMBUSTION GLASS MANUFACTURING SYSTEM AND METHOD

CROSS-REFERENCE TO RELATED APPLICATIONS

This application is a division of U.S. Ser. No. 14/208,029 filed Mar. 13, 2014, now U.S. Pat. No. 9,481,592 issued Nov. 1, 2016, which is a division of U.S. Ser. No. 13/268,098 filed Oct. 7, 2011, now U.S. Pat. No. 8,707,740 issued Apr. 29, 2014, which is related to Applicant's U.S. Pat. No. 8,769,992 issued Jul. 8, 2014, U.S. Pat. No. 8,875,544 issued Nov. 4, 2014, U.S. Pat. No. 8,973,400 issued Mar. 10, 2015, U.S. Pat. No. 8,650,914 issued Feb. 18, 2014, and U.S. Pat. No. 9,776,901 issued Oct. 3, 2017, all of which are incorporated herein by reference.

BACKGROUND INFORMATION

Technical Field

The present disclosure relates generally to the field of submerged combustion glass melters and methods of use.

Background Art

Submerged combustion melters are known for producing molten glass. Submerged combustion melters and their operation may cause exhaust pressure and exhaust volume fluctuations due to large bubbles of gas from submerged combustion burners, which may lead to batch (starting material) carryover and/or molten glass carryover into the melter exhaust. Carryover may lead to reduced exhaust flow or even in some circumstances plugging of the exhaust ducts.

It would be an advance in the submerged combustion glass melting art to develop melters and methods of using them that reduce or overcome one or more of these problems.

SUMMARY

In accordance with the present disclosure, submerged combustion melters and methods of use are described that may allow reduction of melter pressure fluctuations and/or carryover.

A first aspect of the disclosure is a submerged combustion glass manufacturing system comprising:

a melter comprising a floor, a roof, and a wall structure connecting the floor and roof, and an exhaust passage through the roof;

one or more submerged combustion burners mounted in the floor and/or wall structure, the submerged combustion burners configured to discharge combustion products under a level of material being melted in the melter and create turbulent conditions in substantially all of the material; and an exhaust structure fluidly connecting the exhaust passage with an exhaust stack, the exhaust structure comprising a barrier preventing exhaust material from contacting the atmosphere, the barrier defining an exhaust chamber having an interior surface, the exhaust chamber having a cross-sectional area greater than that of the exhaust stack but less than the melter, the barrier configured to maintain temperature and pressure in the exhaust structure at values sufficient to substantially prevent condensation of exhaust material on the interior surface.

A second aspect of the disclosure is a submerged combustion glass manufacturing system comprising:

a melter comprising a floor, a roof, and a wall structure connecting the floor and roof, a feed inlet in a feed end, a molten glass outlet in an exit end, and an exhaust passage through the roof positioned substantially centrally between the feed and exit ends;

one or more submerged combustion burners mounted in the floor and/or wall structure, the submerged combustion burners configured to discharge combustion products under a level of material being melted in the melter and create turbulent conditions in substantially all of the material; and an exhaust structure fluidly connecting the exhaust passage with an exhaust stack, the exhaust structure comprising:

a barrier preventing exhaust material from contacting the atmosphere, the barrier defining an exhaust chamber having an interior surface, the exhaust chamber having a cross-sectional area greater than that of the exhaust stack but less than the melter, the barrier configured to maintain temperature and pressure in the exhaust structure at values sufficient to substantially prevent condensation of exhaust material on the interior surface;

a liquid-cooled transition structure fluidly connecting the exhaust passage and the exhaust structure; and an air inspirator fluidly connecting the barrier and the exhaust stack.

A third aspect of the disclosure is a method of manufacturing glass comprising:

melting glass-forming materials in a submerged combustion melter, the melter comprising a floor, a roof, and a wall structure connecting the floor and roof, and an exhaust passage through the roof;

combusting a fuel in one or more submerged combustion burners mounted in the floor and/or wall structure, the submerged combustion burners discharging combustion products under a level of the glass-forming material being melted in the melter and creating turbulent conditions in substantially all of the material; and exhausting exhaust material from the melter through an exhaust structure fluidly connecting the exhaust passage with an exhaust stack, the exhaust structure comprising a barrier preventing the exhaust material from contacting the atmosphere, the barrier defining an exhaust chamber having an interior surface, the barrier configured to maintain temperature and pressure in the exhaust structure at values sufficient to substantially prevent the exhaust material from condensing on the interior surface.

A fourth aspect of the disclosure is a method of manufacturing glass comprising:

melting glass-forming materials in a submerged combustion melter, the melter comprising a floor, a roof, and a wall structure connecting the floor and roof, and an exhaust passage through the roof;

combusting a fuel in one or more submerged combustion burners mounted in the floor and/or wall structure, the submerged combustion burners discharging combustion products under a level of the glass-forming material being melted in the melter and creating turbulent conditions in substantially all of the material; and exhausting exhaust material from the melter through an exhaust structure fluidly connecting the exhaust passage with an exhaust stack, wherein the exhaust passage is substantially centrally located between a feed end and an exit end of the melter, and the exhausting of the exhaust material through the exhaust structure comprises exhausting the exhaust material substantially centrally between the feed end and the exit end of the melter, wherein the exhaust structure comprises:

a barrier preventing the exhaust material from contacting the atmosphere, the barrier defining an exhaust chamber having an interior surface, the barrier configured to maintain temperature and pressure in the exhaust structure at values sufficient to substantially prevent the exhaust material from condensing on the interior surface;

a liquid-cooled transition structure fluidly connecting the exhaust passage and the exhaust structure; and an air inspirator fluidly connecting the barrier and the exhaust stack.

Systems and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIG. 2 is a schematic side-elevation view of a submerged combustion melter and system embodiment of the present disclosure;

FIG. 3 is a schematic end elevation view, partially in cross-section, of the submerged combustion melter and system embodiment of FIG. 2;

Figure 1:
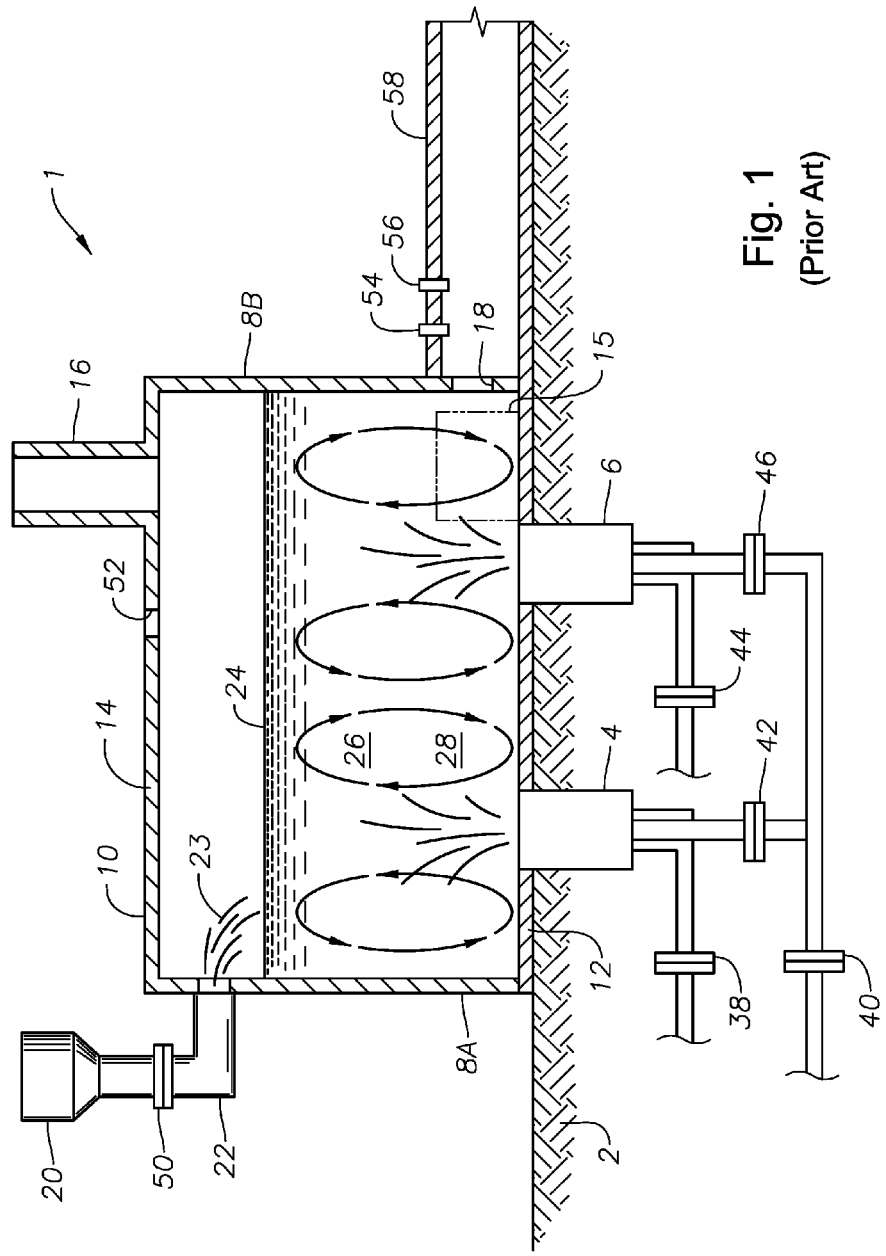
FIG. 1 is a schematic side-elevation view, partially in cross-section, of a prior art submerged combustion melter and system.

It is to be noted, however, that FIGS. 1-6 of the appended drawings may not be to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed methods and systems for carrying out the methods. However, it will be understood by those skilled in the art that the methods and systems may be practiced without these details and that numerous variations or modifications from the specifically described embodiments may be possible and are deemed within the claims or claimable subject matter in this or subsequent patents. All United States (U.S.) published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, current production of glass products using submerged combustion may utilize one or more conventional exhaust ports and such melters may suffer exhaust port plugging and/or reduced flow of exhaust, which may result in reduced or lost production, increased carryover of batch or cullet, and increased ejection of molten glass from the burners to the exhaust due to pulsation of combustion gases emanating from the burners. Such melters also frequently require a sump to catch debris falling off of the inside surfaces of the exhaust port.

Applicants have discovered that by eliminating the customary exhaust port or ports, substantially opening the top of the melter and creating a large volume exhaust area with a low exit flow velocity, prior to the exhaust gases passing to an exhaust duct system and an abatement system commonly used, and optionally locating the exhaust area properly between the feed inlet and molten glass discharge, carryover and ejection of molten glass may be drastically reduced, and in certain embodiments a sump may not be necessary, reducing capital and operating costs.

Various terms are used throughout this disclosure. "Submerged" as used herein means that combustion gases emanate from burners under the level of the molten glass; the burners may be floor-mounted, wall-mounted, or in melter embodiments comprising more than one submerged combustion burner, any combination thereof (for example, two floor mounted burners and one wall mounted burner).

As used herein the terms "combustion gases", "combustion products" and "combustion flames" may be used interchangeably and mean substantially gaseous mixtures of any excess oxidant or fuel, oxides of carbon (such as carbon monoxide, carbon dioxide), oxides of nitrogen, oxides of sulfur, and water. Combustion products may include liquids and solids, for example soot and unburned liquid fuels. "Exhaust material" includes all materials exiting the melter through an exhaust structure, and includes combustion gases, batch and/or cullet carryover, ejected molten glass, inspirated air, and the like. The phrase "the barrier configured to maintain temperature and pressure in the exhaust structure at values sufficient to substantially prevent condensation of exhaust material on the interior surface" essentially means determining the species in the exhaust material most likely to condense and maintaining the temperature and pressure at levels that would substantially prevent that species from condensing. For example, if the species most likely to condense would condense at 1500° F. (815° C.) or lower temperature and/or pressure less than 1 atmosphere, then the temperature of the interior surface of the barrier would be maintained at temperature slightly higher than 1500° F. (for example 1520° C. (826° C.), or 1530° F. (832° C.), or higher) and pressure slightly above 1 atmosphere (for example, 1.1 atmosphere, 1.15 atmosphere, or higher).

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of non-fuels therein, including oxidants, for purposes such as premixing the fuel with the oxidant, or atomizing liquid fuels. As used herein the term "fuel" includes gaseous fuels, liquid fuels, flowable solids, such as powdered carbon or particulate material, waste materials, slurries, and mixtures or other combinations thereof. When the fuel comprises gaseous fuel, the gaseous fuel may be selected from the group consisting of methane, natural gas, liquefied natural gas, propane, carbon monoxide, hydrogen, steam-reformed natural gas, atomized oil or mixtures thereof.

"Oxidant" means air, or compositions comprising the same molar concentration of oxygen as air, while the term "oxygen" means a gas with an oxygen molar concentration of at least 50%. Such oxidants include oxygen-enriched air containing at least 50% vol., oxygen such as "industrially" pure oxygen (99.5%) produced by a cryogenic air separation plant or non-pure oxygen produced by an adsorption process or membrane permeation process (about 90% vol. oxygen or more). In all embodiments of the disclosure the sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Submerged combustion melters useful in methods and systems of the present disclosure may be comprised of metal, ceramic, ceramic-lined metal, or combination thereof. Suitable metals include stainless steels, for example, but not limited to, 306 and 316 steel, as well as titanium alloys, aluminum alloys, carbon steel, and the like.

One aspect of the disclosure is a submerged combustion glass manufacturing system comprising a melter comprising a floor, a roof, and a wall structure connecting the floor and roof, and an exhaust passage through the roof; one or more submerged combustion burners mounted in the floor and/or wall structure, the submerged combustion burners configured to discharge combustion products under a level of material being melted in the melter and create turbulent conditions in substantially all of the material; and an exhaust structure fluidly connecting the exhaust passage with an exhaust stack, the exhaust structure comprising a barrier preventing exhaust material from contacting the atmosphere, the barrier defining an exhaust chamber having an interior surface, the exhaust chamber having a cross-sectional area greater than that of the exhaust stack but less than the melter, the barrier configured to maintain temperature and pressure in the exhaust structure at values sufficient to substantially prevent condensation of exhaust material on the interior surface. Certain submerged combustion glass manufacturing systems may comprise more than one exhaust passage through the roof, and more than one exhaust structure as described herein.

Certain systems of the present disclosure may comprise one or more feed inlets in a feed end of the wall structure, one or more molten glass outlets in an exit end of the wall structure, wherein the exhaust passage through the roof is positioned substantially centrally between the feed and exit ends.

In certain systems of the present disclosure the exhaust passage and exhaust chamber may have a cross-sectional area at least large enough to allow non-turbulent flow of exhaust gases in the exhaust material flowing through the passage and chamber.

In certain systems and methods the submerged combustion burners may be configured to discharge combustion products primarily non-laterally under the level of material being melted in the melter. In certain exemplary system and method embodiments the submerged combustion burners may be configured to discharge combustion products primarily vertically under the level of material being melted in the melter.

In certain systems the wall structure may comprise a feed end wall, an exit end wall, and two side walls, with each side wall connected to both the feed end wall and the exit end wall.

In certain systems of this disclosure the barrier of the exhaust structure may be constructed of materials selected from the group consisting of refractory, metal, and combinations thereof, with the proviso that if metal, the service temperature of the metal is higher than the temperature of the exhaust materials. Examples of suitable metals include, but are not limited to, carbon steel, stainless steels of various grades, Inconel, and the like.

Certain systems embodiments may comprise a fluid-cooled transition structure fluidly connecting the exhaust passage and the exhaust structure. In certain systems the fluid may be a liquid selected from the group consisting of water, organic liquids, inorganic liquids, and combinations thereof.

Certain systems may comprise an air inspirator fluidly connecting the barrier and the exhaust stack. In certain systems the air inspirator may comprise one or more adjustable panels. In certain embodiments the air inspirator may comprise a hood or hoods that may be raised or lowered, for example using rails, guides, jack-screws or other sub-system. Movement may be accomplished using manual or automatic control, and may use electronic, pneumatic, or hydraulic actuation.

In certain systems the barrier of the exhaust structure may have a cross-sectional shape selected from the group consisting of rectangular, round, oval, trapezoidal, triangular, U-shaped, quadrangular, hexagonal, octagonal, parabolic. The cross-sectional shape of the barrier may be the same or different than the cross-sectional shape of the melter.

In certain system embodiments the barrier of the exhaust structure may comprise a refractory lined metal layer wherein the refractory comprises the interior surface of the barrier, the metal layer having air-cooled surfaces that may also function as mechanical supports. The air-cooled surfaces may be fins, flow-through boxes, and the like, and may have channels, baffles, and other surfaces to increase or decrease heat transfer. In certain system embodiments the metal layer may be Inconel, and the air-cooled surfaces may be steel. The air-cooled surfaces or structures may be integral with the metal layer, or may be removably attached separate pieces, such as by bolted flange connections, welding, riveting, and similar attachment mechanisms.

Another aspect of this disclosure are methods comprising melting glass-forming materials in a submerged combustion melter, the melter comprising a floor, a roof, and a wall structure connecting the floor and roof, and an exhaust passage through the roof; combusting a fuel in one or more submerged combustion burners mounted in the floor and/or wall structure, the submerged combustion burners discharging combustion products under a level of the glass-forming material being melted in the melter and creating turbulent conditions in substantially all of the material; and exhausting exhaust material from the melter through an exhaust structure fluidly connecting the exhaust passage with an exhaust stack, the exhaust structure comprising a barrier preventing the exhaust material from contacting the atmosphere, the barrier defining an exhaust chamber having an interior surface, the barrier configured to maintain temperature and pressure in the exhaust structure at values sufficient to substantially prevent the exhaust material from condensing on the interior surface.

In certain methods the exhaust passage may be substantially centrally located between a feed end and an exit end of the melter, and the exhausting of the exhaust material through the exhaust structure comprises exhausting the exhaust material substantially centrally between the feed end and the exit end of the melter.

Certain method embodiments may comprise cooling the exhaust material prior to the exhaust chamber by flowing the exhaust material through a liquid-cooled transition structure fluidly connecting the exhaust passage and the barrier.

Certain method embodiments may comprise inspiring air into the exhaust material through an air inspirator fluidly connecting the barrier and the exhaust stack. Certain methods may comprise adjusting one or more panels of the air inspirator, or moving the air inspirator up or down to let more or less air into the stack.

In certain systems and methods at least some heat used for the melting may come from heat from combustion of at least some of the binder of glass mat and/or roving fed to the melter. In certain systems and methods the submerged combustion melter may be operated at a pressure less than atmospheric pressure. These systems and methods may ensure that any combustion products generated during melting remain in the system and do not escape through the feed inlet. These features are more fully descried in Applicant's U.S. Pat. No. 8,650,914 issued Feb. 18, 2014.

Certain system and method embodiments of this disclosure may include submerged combustion melters comprising fluid-cooled panels, such as described in Applicant's U.S. Pat. No. 8,769,992 issued Jul. 8, 2014.

In certain system and method embodiments, the submerged combustion melter may include one or more submerged combustion burners comprising one or more combustion burners such as described in Applicant's U.S. Pat. No. 8,875,544 issued Nov. 4, 2014.

Certain system and method embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and processes of this disclosure may also measure and/or monitor feed rate of batch or other feed materials, such as glass mat or wound roving, mass of glass mat or wound roving per unit length, web or roving linear speed, and combinations thereof, and use these measurements for control purposes. Exemplary systems and methods of the disclosure may comprise a combustion controller which receives one or more input parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

Certain system and method embodiments may comprise using vibration and/or oscillation of the submerged combustion melter to predict melt viscosity and/or other properties of the initial melt emanating from the melter, as disclosed in Applicant's U.S. Pat. No. 8,973,400 issued Mar. 10, 2015.

Yet other systems and methods may employ a lance above the melt if the melt is foamy in the submerged combustion melter, as described in Applicant's U.S. Pat. No. 9,021,838 issued May 5, 2015.

Referring now to the drawing figures, FIG. 1 is a side-elevation view, partially in cross-section, of a prior art submerged combustion melter system and method embodiment 1, including a glass tank furnace or melter 10 positioned on a plant floor or other surface 2, including two burners 4 and 6. Melter 10 includes sidewalls 8 (an inlet end wall 8A and an outlet end wall 8B are illustrated), a floor 12, a roof 14, a may include a sump 15 for handling material that falls off the inside surfaces of an exhaust chute 16. Prior art melter and system embodiment 1 includes a molten glass melt exit 18. A glass-forming material feed bin 20 may be attached to melter sidewall 8 via a conduit 22, and FIG. 1 illustrates solid batch and/or cullet 23 entering melter 10, with a partially molten level of materials 24 indicated. Melt level 24 may be sensed by a level sensor 52. Melt 26 in melter 10 may be generally in a turbulent condition as indicated by flow-indicating arrows in melt 26, caused by combustion products 28 from burners 4, 6, although the prior art also includes melters having non-turbulent layers, such as when burners are positioned in the sidewalls, and the combustion products discharge laterally. Sidewalls 8, floor 12, and roof 14 are typically composed of ceramic or other refractory material, while exhaust chute 16 typically is refractory-lined metal, and leads to a metal duct system and baghouse for handling solid particulates that may escape melter 10. Prior art system 1 may include various fuel and oxidant flow meters, such as oxidant flow meters 38 and 44, and fuel flow meters 40, 42, and 46. Melt typically discharges into a forehearth 58. A melt temperature sensor 54 and a melt flow meter 56 may be included in forehearth 58, as well as burner and melter control systems (not illustrated).

FIGS. 2 and 3 are side elevation and end elevation views, respectively, partially in cross-section, of a system embodiment 100 in accordance with the present disclosure, including a glass tank furnace or melter 110 positioned on a plant floor or other surface 102, including four burners 104A, 104B, 106A, and 106B (burner 106A is hidden in these views), one or more of which may be of the adjustable burner type described in Applicant's U.S. Pat. No. 8,875,544 issued Nov. 4, 2014, comprising first and second conduits configured to form a primary annulus between the external surface of the first conduit and the internal surface of the second conduit, and an adjustable structure comprising a generally cylindrical central hub adjustable axially in relation to and removably attached to the first end of the first conduit, the hub defining a central passage and one or more non-central through passages. More than or less than two burners may be used, as well as burners of other designs, as long as one submerged burner is present. Melter 110 includes an inlet end wall 108A, an outlet end wall 108B, side walls 109A and 109B, a floor 112, a roof 114, an exhaust chute 116, and a glass melt exit 118. A glass-forming material feed bin 120 may be attached to melter inlet wall 108A. One or more burners may be in one or more sidewalls 108, as long as the flame and/or products of combustion emanate below the surface of the melt. As in prior art system 1 illustrated in FIG. 1, end walls 108A and B, side walls 109A and 109B, floor 112, and roof 114 are typically composed of ceramic or other refractory material. Other melter designs, having other feed arrangements, burner arrangements, and wall designs, such as disclosed in Applicant's patents are considered within the present disclosure.

In accordance with the present disclosure, system 100 illustrated in FIGS. 2 and 3 further comprises an exhaust passage 122 in roof 114 fluidly connecting melter 110 and an exhaust structure 130. Exhaust structure 130 comprises, in embodiment 100, a refractory lining 124 having an interior surface 125 defining an exhaust chamber 123, and an Inconel or other metal structure 126 (determined by service temperature) such as stainless steel, carbon steel, and the like, with metal thickness generally increasing as temperature increases to afford greater strength. Embodiment 100 also includes heat transfer surfaces 128, which may be flow-through air panels, where air flows vertically upward, co-currently to flow of exhaust gases. A lower transition connector 134 is a liquid cooled transition that fluidly connects exhaust passage 122 with exhaust chamber 123. The cooling liquid may be any heat transfer liquid, although chilled water may be the lowest cost alternative. An air inspirator 131 includes four adjustable panels 132, which may be hinged panels, for adjusting the amount of air inspirated into stack 116. Inspirator 131 includes in this embodiment a metal transition piece 136 that transitions exhaust structure 130 to the conventional stack 116. Support legs 138 and a forehearth 158 are also included in embodiment 100.

FIGS. 2 and 3 also depict two axis, A1 and A2. Axis A1 illustrates the center line of exhaust chamber 123 between end walls of exhaust structure 130, and generally indicates that chamber 123 and exhaust passage 122 are substantially centrally located with respect to melter inlet wall 108A and molten glass outlet wall 108B. Axis A2 illustrates the center line of exhaust chamber 123 between side walls of exhaust structure 130, and generally indicates that chamber 123 and exhaust passage 122 are substantially centrally located with respect to side walls 109A and 109B of melter 110. As used herein, "substantially centrally" means that there may be some deviation from exact center, perhaps 5 percent, or 10 percent or 25 percent either way.

Figure 4:
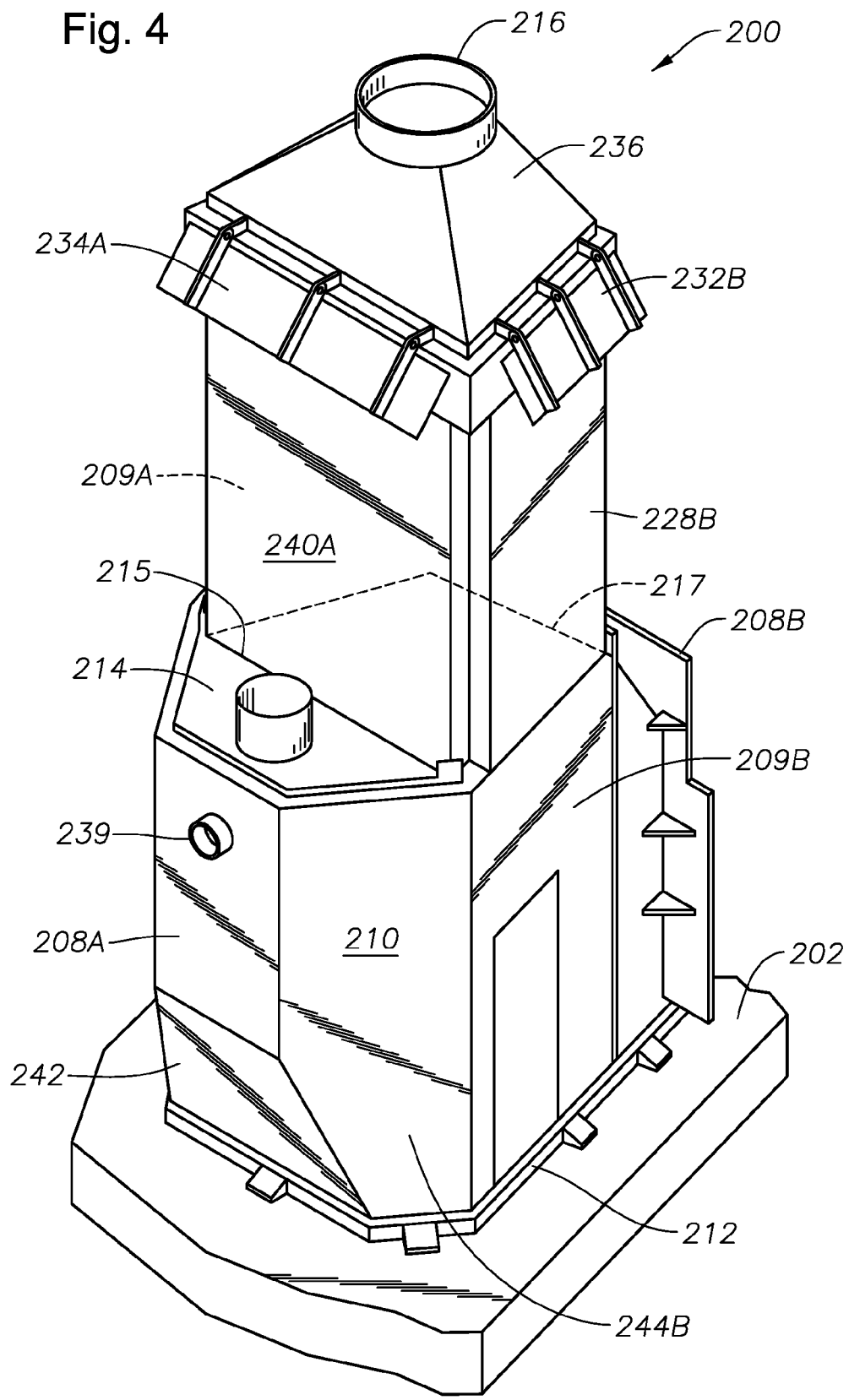
FIGS. 4 and 4A are schematic perspective views of two other melter and system embodiments of the present disclosure.
Figure 4A:
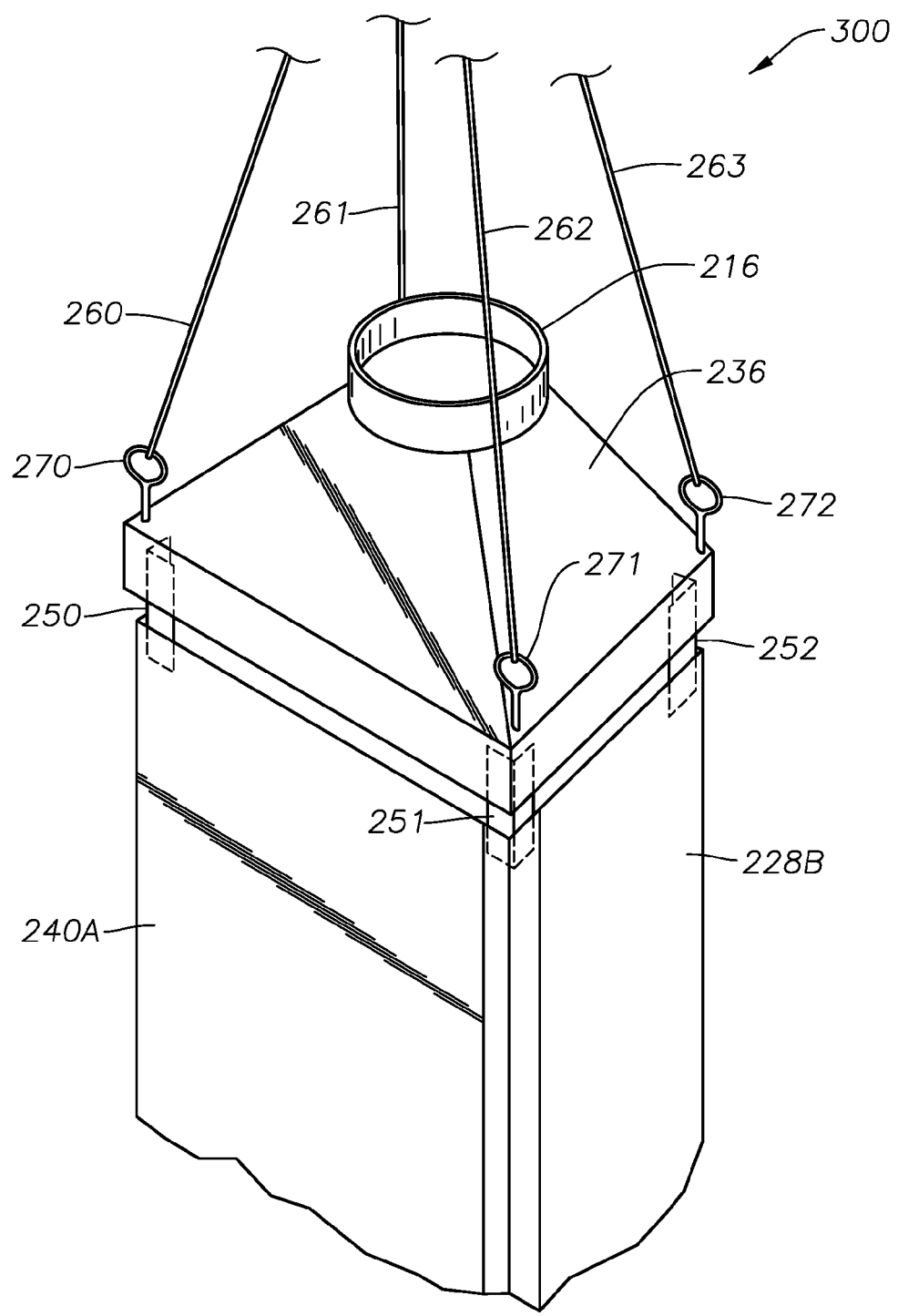
Figure 6:
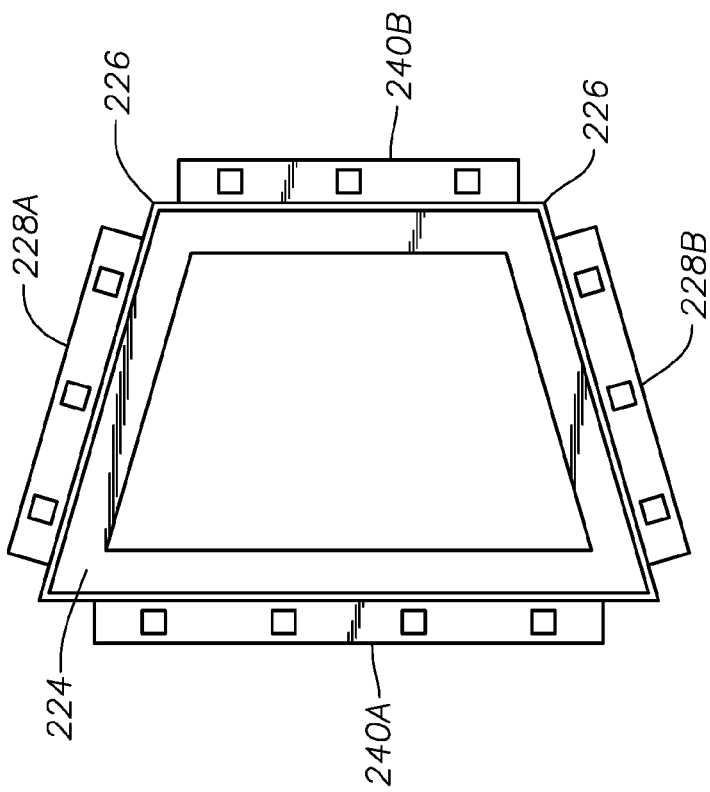
FIG. 6 is a schematic plan view of the structure illustrated in FIG. 5.

FIG. 4 is a schematic perspective view of another melter and system embodiment 200 of the present disclosure. Melter and system 200 are mounted on a plant floor 202 or other surface. Submerged combustion burners are not viewable in this embodiment, but are inserted through the floor 212 as in embodiment 100. Melter 210 includes inlet and outlet end walls 208A and 208B, respectively, side walls 209A and 209B, and a roof 214. Melter 210 has a trapezoidal shape in embodiment 200, and thus includes a pair of angled side walls 244A, 244B (only 244B being visible), as well as a downwardly sloping end panel 242. Melter 210 actually has a double trapezoidal shape, with the inlet end having the longer side 215 of a first trapezoid mating with the longer side of a second trapezoid having a second end 217, shown by the dashed line in FIG. 4. Melter 210 includes a feed inlet 239, and a molten glass outlet near a bottom of end wall 208B that is not viewable in FIG. 4.

An exhaust structure in embodiment 200 is defined by a front cooling panel 240A, back wall cooling panel 240B (not shown) and side wall cooling panels 228A and 228B (side wall cooling panel 228A not viewable in FIG. 4). An air inspirator is provided comprising in this embodiment two adjustable side panels 232A and 232B, an adjustable front panel 234A, and an adjustable back panel 234B. Adjustable panels 232 and 234 may be adjusted using hinges, hydraulic or pneumatic pistons, motors, or any other mechanism. A metal transition piece or hood 236 is provided, fluidly connecting inspirator panels 232, 234 to a connector 216 that connects to a conventional metal stack (not illustrated). In an alternative embodiment 300, illustrated schematically in FIG. 7, inspirator panels 232 and 234 are not required. Instead, hood 236 is movable up and down to adjust air inspiration into hood 236. Hood 236 may be configured to move up and down in a variety of ways, for example by adding guides, rails, wheels, jack screws, one or more motors, and the like to the hood. In embodiment 300 of FIG. 7, three guides 250, 251, and 252 of a set of four corner guides are illustrated, partially in phantom. Hood 236 may be moved up or down using guide wires 260, 261, 262, and 263, for example, using lifting eyes 270, 271, 272, and 274 (the latter not viewable in FIG. 7).

Figure 5:
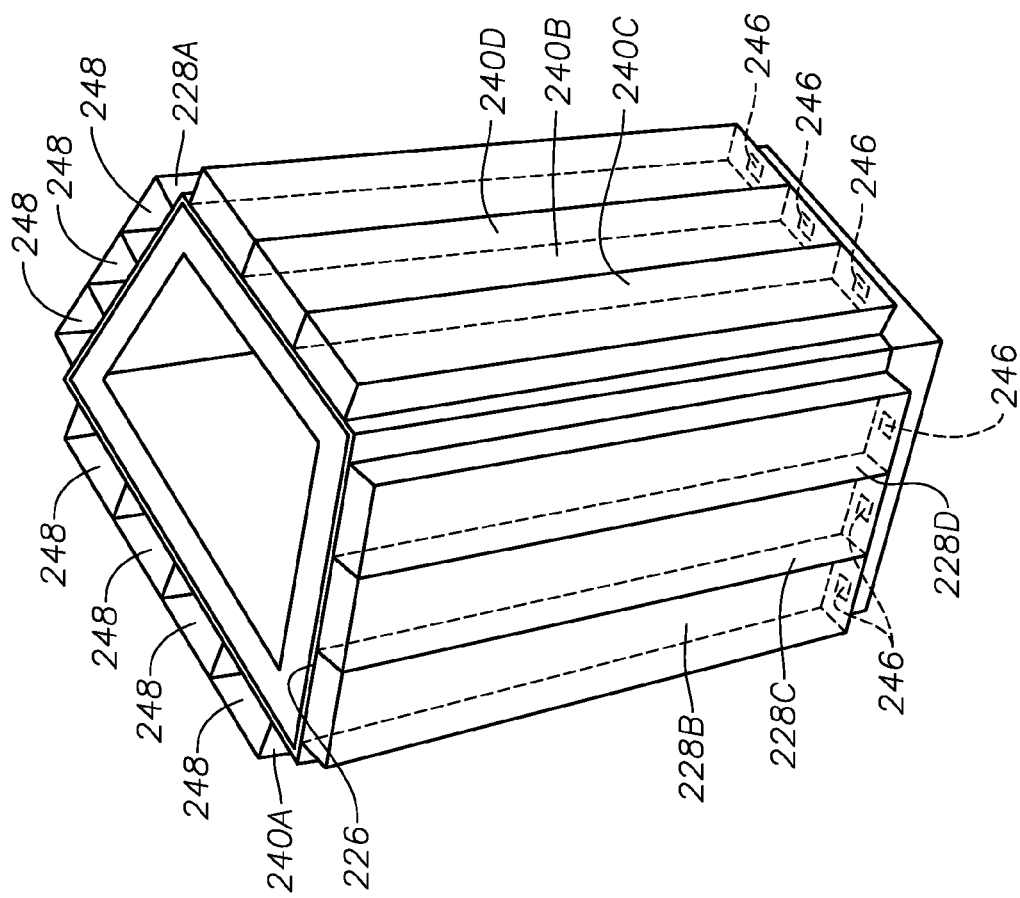
FIG. 5 is a schematic perspective view of a portion of the exhaust structure of the melter and system embodiment of FIG. 4.

FIG. 5 is a more detailed schematic perspective view of a portion of the exhaust structure of the melter and system embodiment of FIG. 4, illustrating in more detail cooling panels 228B and 240B, each having three vertical flowthough sections separated by partitions 228C, 228D, 240C, and 240D. Cooling panels 228 and 240 have air inlets generally noted at 246 and air outlets generally noted at 248. Also viewable in FIG. 5 is metal panel 226 (Inconel in embodiment 200), while refractory lining 224 is shown schematically in the plan view of FIG. 6 of the structure illustrated in FIG. 5.

Melter and system embodiments 100 and 200, as well as other melters, systems, and methods in accordance with the present disclosure, may process a full range of glass compositions and batch materials including commercial borosilicate and soda-lime glasses, as well as compositions for commercial mineral and stone wools. The melter dimensions and the number of submerged combustion burners may vary. The typical bubble (void) diameter in melt samples may be about 0.1 mm, but with time at temperatures, as is provided by a refractory lined channel or forehearth of varying length and depth, the small bubbles may coalesce and form larger voids that rise in the flowing molten glass and may be removed from the bulk glass. With enough time and temperature, the glass becomes "fined" to the state of a solid glass without voids. If foamed glass is desired, insulating foam glass depends on a significant void fraction to produce a closed cell, light-weight glass that has insulating properties. Glass produced from an SCM of this disclosure may have a significant closed cell void fraction that could be used as an insulating glass panel. Some modifications, such as described in Applicant's U.S. Pat. No. 8,997,525 issued Apr. 7, 2015, may be needed to control void fraction to a higher fraction (percentage) and to increase the average size of the voids from the typical 0.1 mm diameter to 1 mm or more.

Exhaust chambers, connectors, and transitions may have a wide variety of cross-sectional shapes, and the cross-sectional shape may be the same or different along the length (flow direction) of exhaust chambers, connectors, and transitions. The cross-sections may be rectangular (including square), round, oval, triangular, U-shaped (ends are U-shaped, with linear connecting walls), quadrangular (for example trapezoidal), hexagonal, octagonal, parabolic, and the like. The exhaust structure may have several different materials of construction. In certain embodiments it may be all refractory, but these embodiments are heavy and may require strong supporting steel structure. In other embodiments the exhaust structure may be all metal (for example Inconel for higher temperatures) but in these embodiments there may be a need for greater cooling to keep temperatures below the service limits of the metal. Finally, some embodiments may comprise a hybrid design including both refractory and metal, as in embodiments 100 and 200 described herein.

In retrofitting an existing melter, or constructing a new system, a hybrid system may avoid significant steel structural modifications. In embodiments 100 and 200, Inconel with a refractory liner and air cooling on the backside of the Inconel metal was used to ensure the metal stayed below 1500° F. (816° C.), the service temperature limit for the thickness of Inconel used. (As service temperature of the metal increases, metal thickness increases.) This has worked very well and does not take much air cooling of the Inconel. A key is keeping the exhaust gases hot enough so condensation does not occur and that the molten glass and other materials that get thrown up into the exhaust flows back down the interior surface of the barrier back into the melter. For some thicknesses of metal, water cooling gave too much cooling to accomplish what was desired, but this does not rule out liquids being used as heat transfer fluids.

In embodiment 200, the lower transition piece, which is not viewable in FIG. 4 (corresponding to lower transition connector 134 in embodiment 100) between the melter 210 and the exhaust structure (228, 240) was a 9-inch (23 cm) high water-cooled section that supported the Inconel and refractory exhaust structure. The inspirator section (232, 234) was stainless steel metal and cooled only by the air flow caused by the suction of the abatement exhaust fan pulling cooling air in to drop the exhaust gases temperature down to about 950° F. (510° C.) for transport to a baghouse where the exhaust is further cooled to ~200° F. (about 93° C.) so as not to damage the bags in the baghouse. From the inspirator section up was all typical exhaust system duct work.

Submerged combustion melters in embodiments described herein, except for the exhaust structure modifications and possible elimination of a sump, may be any of the currently known submerged combustion melter designs, or may be one of those described in Applicant's U.S. Pat. No. 8,769,992 issued Jul. 8, 2014, incorporated herein by reference. Submerged combustion melters useful in the practice of the methods and systems of this disclosure may take any number of forms, including those described in the '992 patent, which describes sidewalls forming an expanding melting zone formed by a first trapezoidal region, and a narrowing melting zone formed by a second trapezoidal region, wherein a common base between the trapezoids defines the location of the maximum width of the melter, as described herein with respect to embodiment 200 of FIG. 4.

Submerged combustion melters may be fed a variety of feed materials by one or more roll stands, which in turn supports one or more rolls of glass mat, as described in Applicant's U.S. Pat. No. 8,650,914 issued Feb. 14, 2014 incorporated herein by reference. In certain embodiments powered nip rolls may include cutting knives or other cutting components to cut or chop the mat (or roving, in those embodiments processing roving) into smaller length pieces prior to entering the melter. Also provided in certain embodiments is a glass batch feeder. Glass batch feeders are well-known in this art and require no further explanation.

Certain embodiments may comprise a process control scheme for the submerged combustion melter and burners. For example, as explained in the '914 patent, a master process controller may be configured to provide any number of control logics, including feedback control, feed-forward control, cascade control, and the like. The disclosure is not limited to a single master process controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements and feeding devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems.

As mentioned previously, the methods of Applicant's patent using the vibrations and oscillations of the melter itself, may prove useful predictive control inputs. Measurement of vibration is a well-developed science in its own right and requires little explanation to the skilled vibration sensor artisan. A good summary is provided by Furman, B. J., "*Vibration Measurement*", San Jose State University, Department of Mechanical and Aerospace Engineering, pp. 1-14, 22 Nov. 2005, incorporated herein by reference. Furman described vibration as interchange between potential and kinetic energy in bodies with finite stiffness and mass that arises from time dependent energy input, and gives examples, including fluid flow. Without being limited to any particular theory, the inventors herein theorize that the oxidant and/or fuel fluid flows through submerged combustion burners, and the flames and combustion products emanating from those burners, contribute to the vibration and/or oscillation observed in submerged combustion glass tank furnaces. Basic parameters of vibration study, such as amplitude, amplitude peak level, peak-to-peak amplitude, root-mean-square (RMS) amplitude level, and average (rectified) amplitude, are given schematically in Furman. See also Applicant's U.S. Pat. No. 8,973,400 issued Mar. 10, 2015.

Those having ordinary skill in this art will appreciate that there are many possible variations of the melter, exhaust structures, forehearths, burners, and heat transfer components described herein, and will be able to devise alternatives and improvements to those described herein that are nevertheless considered to be within the claims of the present patent.

Burners useful in the melter apparatus described herein include those described in U.S. Pat. Nos. 4,539,034; 3,170,781; 3,237,929; 3,260,587; 3,606,825; 3,627,504; 3,738,792; 3,764,287; and 7,273,583, and Applicant's U.S. Pat. No. 8,707,740. One useful burner, for example, is described in the '583 patent as comprising a method and apparatus providing heat energy to a bath of molten material and simultaneously creating a well-mixed molten material. The burner functions by firing a burning gaseous or liquid fuel-oxidant mixture into a volume of molten material. The burners described in the '583 patent provide a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process in bubbles rising to the surface of the melt. In one embodiment, the burners described in the '583 patent comprises an inner fluid supply tube having a first fluid inlet end and a first fluid outlet end and an outer fluid supply tube having a second fluid inlet end and a second fluid outlet end coaxially disposed around the inner fluid supply tube and forming an annular space between the inner fluid supply tube and the outer fluid supply tube. A burner nozzle is connected to the first fluid outlet end of the inner fluid supply tube. The outer fluid supply tube is arranged such that the second fluid outlet end extends beyond the first fluid outlet end, creating, in effect, a combustion space or chamber bounded by the outlet to the burner nozzle and the extended portion of the outer fluid supply tube. The burner nozzle is sized with an outside diameter corresponding to the inside diameter of the outer fluid supply tube and forms a centralized opening in fluid communication with the inner fluid supply tube and at least one peripheral longitudinally oriented opening in fluid communication with the annular space between the inner and outer fluid supply tubes. In certain embodiments, a longitudinally adjustable rod is disposed within the inner fluid supply tube having one end proximate the first fluid outlet end. As the adjustable rod is moved within the inner fluid supply tube, the flow characteristics of fluid through the inner fluid supply tube are modified. A cylindrical flame stabilizer element is attached to the second fluid outlet end. The stable flame is achieved by supplying oxidant to the combustion chamber through one or more of the openings located on the periphery of the burner nozzle, supplying fuel through the centralized opening of the burner nozzle, and controlling the development of a self-controlled flow disturbance zone by freezing melt on the top of the cylindrical flame stabilizer element. The location of the injection point for the fuel-oxidant mixture below the surface of the melting material enhances mixing of the components being melted and increases homogeneity of the melt. Thermal NO emissions are greatly reduced due to the lower flame temperatures resulting from the melt-quenched flame and further due to insulation of the high temperature flame from the atmosphere.

In certain embodiments the burners may be floor-mounted burners. In certain embodiments, the burners may be positioned in rows substantially perpendicular to the longitudinal axis (in the melt flow direction) of the melter. In certain embodiments, the burners may be positioned to emit combustion products into molten glass in a melting zone of the melter in a fashion so that the gases penetrate the melt generally perpendicularly to the floor. In other embodiments, one or more burners may emit combustion products into the melt at an angle to the floor, as taught in Applicant's U.S. Pat. No. 8,769,992.

Submerged combustion melters useful in systems and methods in accordance with the present disclosure may also comprise one or more wall-mounted submerged combustion burners, and/or one or more roof-mounted burners. Roof-mounted burners may be useful to pre-heat the melting zone of the melter, and may serve as ignition sources for one or more submerged combustion burners. Melters having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of particles to the exhaust, one or more roof-mounted burners could be used to form a curtain to prevent particulate carryover. In certain embodiments, all submerged combustion burners are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain melter embodiments, in certain melter zones, in forehearths, and so on. In certain embodiments the oxy-fuel burners may comprise one or more submerged combustion burners each having co-axial fuel and oxidant tubes forming an annular space therebetween, wherein the outer tube extends beyond the end of the inner tube, as taught in U.S. Pat. No. 7,273,583, incorporated herein by reference. Burners may be flush-mounted with the melter floor in certain embodiments. In other embodiments, such as disclosed in the '583 patent, a portion of one or more of the burners may extend slightly into the melt above the melter floor.

In certain embodiments, melter side walls may have a free-flowing form, devoid of angles. In certain other embodiments, side walls may be configured so that an intermediate location may comprise an intermediate region of the melter having constant width, extending from a first trapezoidal region to the beginning of a narrowing melting region. Other embodiments of suitable melters are described in the above-mentioned '992 patent.

As mentioned herein, useful melters may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids which may be organic, inorganic, or some combination thereof, for example, salt solutions, glycol solutions, oils and the like. Other possible heat transfer fluids include steam (if cooler than the melt temperature), carbon dioxide, or mixtures thereof with nitrogen. Heat transfer fluids may be compositions comprising both gas and liquid phases, such as the higher chlorofluorocarbons.

Melters and channels described herein may be constructed using cast concretes such as disclosed in U.S. Pat. No. 4,323,718. Two cast concrete layers are described in the '718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter and channel refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced.

The total quantities of fuel and oxidant used by the combustion system may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

Figure 7:
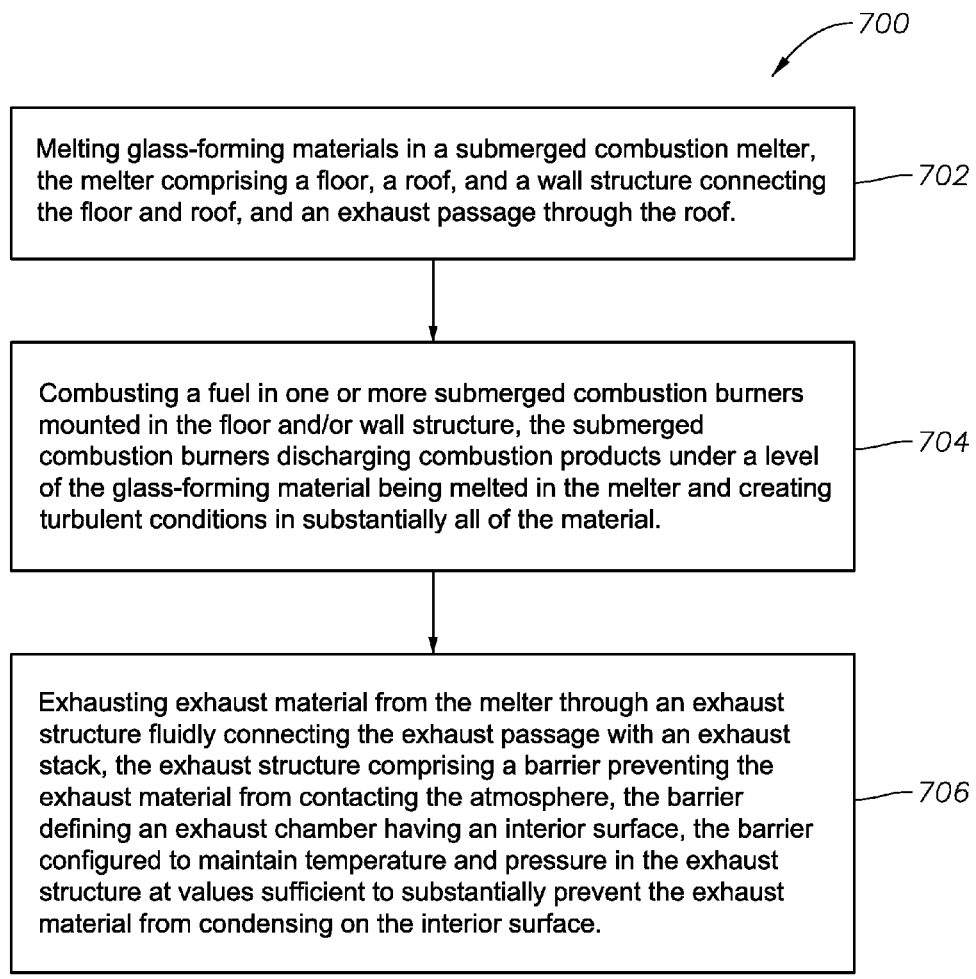
FIGS. 7 and 8 are logic diagrams of two methods in accordance with the present disclosure.
Figure 8:
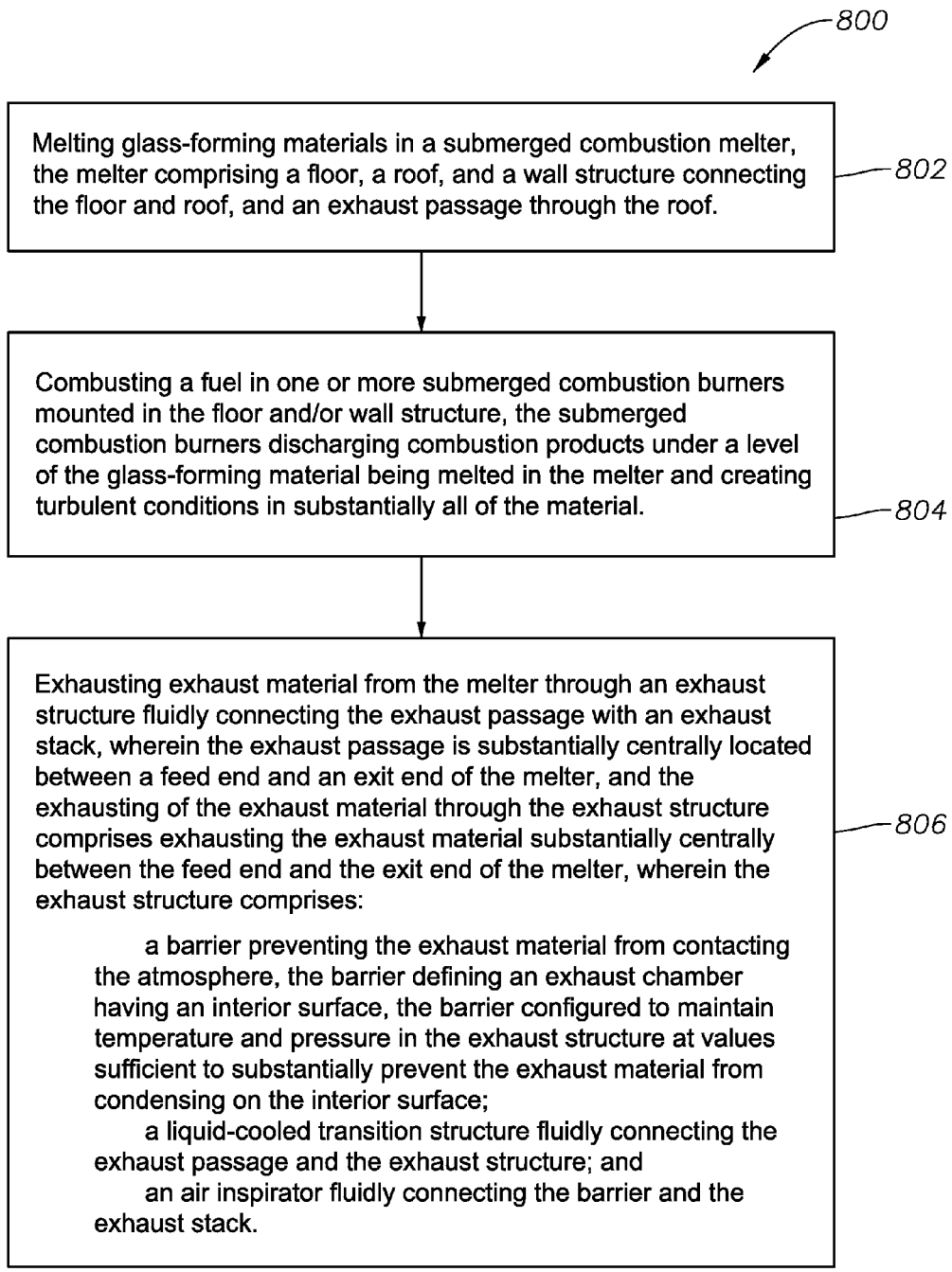

FIGS. 7 and 8 are logic diagrams of two methods in accordance with the present disclosure. The method of embodiment 700 of FIG. 7 comprises melting glass-forming materials in a submerged combustion melter, the melter comprising a floor, a roof, and a wall structure connecting the floor and roof, and an exhaust passage through the roof, box 702. Method embodiment 700 also includes combusting a fuel in one or more submerged combustion burners mounted in the floor and/or wall structure, the submerged combustion burners discharging combustion products under a level of the glass-forming material being melted in the melter and creating turbulent conditions in substantially all of the material, box 704. Method embodiment 700 also includes exhausting exhaust material from the melter through an exhaust structure fluidly connecting the exhaust passage with an exhaust stack, the exhaust structure comprising a barrier preventing the exhaust material from contacting the atmosphere, the barrier defining an exhaust chamber having an interior surface, the barrier configured to maintain temperature and pressure in the exhaust structure at values sufficient to substantially prevent the exhaust material from condensing on the interior surface, box 706. It will be appreciated that all of the activities delineated in boxes 702, 704, and 706 may occur simultaneously.

Another method of this disclosure is presented in the logic diagram of FIG. 8 as embodiment 800. Embodiment 800 is a submerged combustion method of manufacturing glass, and comprises melting glass-forming materials in a submerged combustion melter, the melter comprising a floor, a roof, and a wall structure connecting the floor and roof, and an exhaust passage through the roof, box 802. Method embodiment 800 also includes combusting a fuel in one or more submerged combustion burners mounted in the floor and/or wall structure, the submerged combustion burners discharging combustion products under a level of the glass-forming material being melted in the melter and creating turbulent conditions in substantially all of the material, box 804. Method embodiment 800 further includes exhausting exhaust material from the melter through an exhaust structure fluidly connecting the exhaust passage with an exhaust stack, box 806, wherein the exhaust passage is substantially centrally located between a feed end and an exit end of the melter, and the exhausting of the exhaust material through the exhaust structure comprises exhausting the exhaust material substantially centrally between the feed end and the exit end of the melter, wherein the exhaust structure comprises: a barrier preventing the exhaust material from contacting the atmosphere, the barrier defining an exhaust chamber having an interior surface, the barrier configured to maintain temperature and pressure in the exhaust structure at values sufficient to substantially prevent the exhaust material from condensing on the interior surface; a liquid-cooled transition structure fluidly connecting the exhaust passage and the exhaust structure; and an air inspirator fluidly connecting the barrier and the exhaust stack. It will be appreciated that all of the activities delineated in boxes 802, 804, and 806 may occur simultaneously.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A submerged combustion method of manufacturing glass comprising:
   melting glass-forming materials in a submerged combustion melter, the melter comprising a floor, a roof, and a wall structure connecting the floor and roof, and an exhaust passage through the roof;
   combusting a fuel in one or more submerged combustion burners mounted in the floor and/or wall structure, the submerged combustion burners discharging combustion products under a level of the glass-forming material being melted in the melter and creating turbulent conditions in substantially all of the material; and
   exhausting exhaust material from the melter through an exhaust structure fluidly connecting the exhaust passage with an exhaust stack, wherein the exhaust passage is substantially centrally located between a feed end and an exit end of the melter, and the exhausting of the exhaust material through the exhaust structure comprises exhausting the exhaust material substantially centrally between the feed end and the exit end of the melter, wherein the exhaust structure comprises:
      a barrier preventing the exhaust material from contacting the atmosphere, the barrier defining an exhaust chamber having an interior surface, the barrier configured to maintain temperature and pressure in the exhaust structure at values sufficient to substantially prevent the exhaust material from condensing on the interior surface;
      a liquid-cooled transition structure fluidly connecting the exhaust passage and the exhaust structure; and
      an air inspirator fluidly connecting the barrier and the exhaust stack.

2. A submerged combustion glass manufacturing method comprising:
   melting glass-forming materials in a submerged combustion melter, the melter comprising a floor, a roof, and a wall structure connecting the floor and roof, and an exhaust passage through the roof;
   combusting a fuel in one or more submerged combustion burners mounted in the floor and/or wall structure, the submerged combustion burners discharging combustion products under a level of the glass-forming material being melted in the melter and creating turbulent conditions in substantially all of the material;
   exhausting exhaust material from the melter through an exhaust structure fluidly connecting the exhaust passage with an exhaust stack, the exhaust structure comprising a barrier preventing the exhaust material from contacting the atmosphere, the barrier defining an exhaust chamber having an interior surface, the barrier configured to maintain temperature and pressure in the exhaust structure at values sufficient to substantially prevent the exhaust material from condensing on the interior surface; and
   cooling the exhaust material prior to the exhaust chamber by flowing the exhaust material through a liquid-cooled transition structure fluidly connecting the exhaust passage and the barrier.

3. The method of claim 2 wherein the exhaust passage is substantially centrally located between a feed end and an exit end of the melter, and the exhausting of the exhaust material through the exhaust structure comprises exhausting the exhaust material substantially centrally between the feed end and the exit end of the melter.

4. A submerged combustion glass manufacturing method comprising:
   melting glass-forming materials in a submerged combustion melter, the melter comprising a floor, a roof, and a wall structure connecting the floor and roof, and an exhaust passage through the roof;
   combusting a fuel in one or more submerged combustion burners mounted in the floor and/or wall structure, the submerged combustion burners discharging combustion products under a level of the glass-forming material being melted in the melter and creating turbulent conditions in substantially all of the material;
   exhausting exhaust material from the melter through an exhaust structure fluidly connecting the exhaust passage with an exhaust stack, the exhaust structure comprising a barrier preventing the exhaust material from contacting the atmosphere, the barrier defining an exhaust chamber having an interior surface, the barrier configured to maintain temperature and pressure in the exhaust structure at values sufficient to substantially prevent the exhaust material from condensing on the interior surface; and
   inspiring air into the exhaust material through an air inspirator fluidly connecting the barrier and the exhaust stack.

5. The method of claim 4 wherein the exhaust passage is substantially centrally located between a feed end and an exit end of the melter, and the exhausting of the exhaust material through the exhaust structure comprises exhausting the exhaust material substantially centrally between the feed end and the exit end of the melter.

6. The method of claim 4 comprising adjusting the air inspirator to allow more or less air to enter the stack.

7. A submerged combustion glass manufacturing method comprising:
- melting glass-forming materials in a submerged combustion melter, the melter comprising a floor, a roof, and a wall structure connecting the floor and roof, and an exhaust passage through the roof;
- combusting a fuel in one or more submerged combustion burners mounted in the floor and/or wall structure, the submerged combustion burners discharging combustion products under a level of the glass-forming material being melted in the melter and creating turbulent conditions in substantially all of the material;
- exhausting exhaust material from the melter vertically upward through a vertical exhaust structure fluidly connecting the exhaust passage with an exhaust stack, the vertical exhaust structure comprising a barrier preventing the exhaust material from contacting the atmosphere, the barrier defining a vertical exhaust chamber having an interior surface, the barrier configured to maintain temperature and pressure in the vertical exhaust structure at values sufficient to substantially prevent the exhaust material from condensing on the interior surface.

8. The method of claim 7 wherein the exhaust passage is substantially centrally located between a feed end and an exit end of the melter, and the exhausting of the exhaust material vertically upward through the vertical exhaust structure comprises exhausting the exhaust material substantially centrally between the feed end and the exit end of the melter.

9. The method of claim 7 comprising cooling the exhaust material prior to the vertical exhaust chamber by flowing the exhaust material vertically upward through a liquid-cooled transition structure fluidly connecting the exhaust passage and the barrier.

10. The method of claim 7 comprising inspiring air into the exhaust material through an air inspirator fluidly connecting the barrier and the exhaust stack.

11. The method of claim 10 comprising adjusting the air inspirator to allow more or less air to enter the stack.

* * * * *